United States Patent
Martin et al.

(10) Patent No.: US 8,370,397 B1
(45) Date of Patent: Feb. 5, 2013

(54) ENHANCED DATA COLLECTION TECHNIQUES

(75) Inventors: Justin A. Martin, Olathe, KS (US); Brian J. Washburn, Kansas City, MO (US)

(73) Assignee: Sprint Communications Company L.P., Overland Park, KS (US)

(*) Notice: Subject to any disclaimer, the term of this patent is extended or adjusted under 35 U.S.C. 154(b) by 95 days.

(21) Appl. No.: 12/938,207

(22) Filed: Nov. 2, 2010

(51) Int. Cl.
*G06F 17/30* (2006.01)
*G06F 15/16* (2006.01)

(52) U.S. Cl. .................... 707/802; 707/602

(58) Field of Classification Search ............ 707/602
See application file for complete search history.

(56) References Cited

U.S. PATENT DOCUMENTS

| | | | |
|---|---|---|---|
| 2002/0099753 A1* | 7/2002 | Hardin et al. | 709/1 |
| 2003/0055835 A1* | 3/2003 | Roth | 707/102 |
| 2004/0044665 A1* | 3/2004 | Nwabueze | 707/9 |

OTHER PUBLICATIONS

Martin, Justin A., et al., Patent Application entitled "Enhanced Data Collection Techniques," filed on Jan. 11, 2012, U.S. Appl. No. 13/348,437.

* cited by examiner

*Primary Examiner* — Tony Mahmoudi
*Assistant Examiner* — Brittany N McCue

(57) ABSTRACT

A data collection system is provided. The system comprises a plurality of data sources that produce data. At least some of the plurality of data sources produce data in different formats. The system also comprises a plurality of listeners stored in a computer readable storage medium that, when executed by a processor, receive the data from the plurality of data sources, identify the data, parse the data, convert the data into a generic format, and validate the converted data. The plurality of listeners are implemented using a script programming language. The system further comprises a loader stored in a computer readable storage medium that, when executed by a processor, loads the converted data into a database. The loader is implemented using an object oriented programming language.

11 Claims, 5 Drawing Sheets

ENHANCED DATA COLLECTION TECHNIQUES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises today may maintain server farms to process enterprise data. A server farm is a collection of servers. For example, a server farm may comprise hundreds or even thousands of servers. Enterprises may collect data from each of the servers in the server farm. For example, an enterprise may collect application data from applications executing on the servers. The enterprise may store this data in a database to enable access to the data at a later time. For instance, a billing application and a marketing application may be executing on one or more servers in the server farm. An enterprise may collect data from the billing application and the marketing application and store the data in a database. Collecting and storing such data may enable the billing department and the marketing department to perform analysis on their respective data.

SUMMARY

In an embodiment, a data collection system is disclosed. The system comprises a plurality of data sources that produce data. At least some of the plurality of data sources produce data in different formats. The system also comprises a plurality of listeners stored in a computer readable storage medium that, when executed by a processor, receive the data from the plurality of data sources, identify the data, parse the data, convert the data into a generic format, and validate the converted data. The plurality of listeners are implemented using a script programming language. The system further comprises a loader stored in a computer readable storage medium that, when executed by a processor, loads the converted data into a database. The loader is implemented using an object oriented programming language.

In an embodiment, a computer-implemented method for collecting data is disclosed. The method comprises receiving, by a plurality of listeners implemented using a script programming language, stored on computer-readable medium, and executed by a processor, data from a plurality of data sources. The data comprises different formats. The method also comprises converting, by the plurality of listeners, the data into extensible markup language data sets and validating, by the plurality of listeners, the extensible markup language data sets. The method further comprises loading, by a loader implemented using an object oriented programming language, stored on a computer-readable medium, and executed by a processor, the extensible markup language data sets into a database.

In an embodiment, a data collection system is disclosed. The system comprises a plurality of data sources that produce data. At least some of the plurality of data sources produce data in different formats. The system also comprises a plurality of files. Each of the plurality of files is associated with a different size file line. The system further comprises a plurality of listeners stored in a computer readable storage medium that, when executed by a processor, receive the data from the plurality of data sources, identify the data, parse the data, convert the data into extensible markup language data sets, validate the extensible markup language data sets, and write the extensible markup language data sets to the plurality of files. The system additionally comprises a plurality of loaders stored in a computer readable storage medium that, when executed by a processor, load the extensible markup language data sets into a database. Each of the plurality of loaders loads file lines of a certain size from one of the plurality of files. The system further comprises a plurality of JAVA virtual machines. Each of the plurality of JAVA virtual machines is tuned differently and each of the plurality of loaders operates in a different one of the plurality of JAVA virtual machines.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
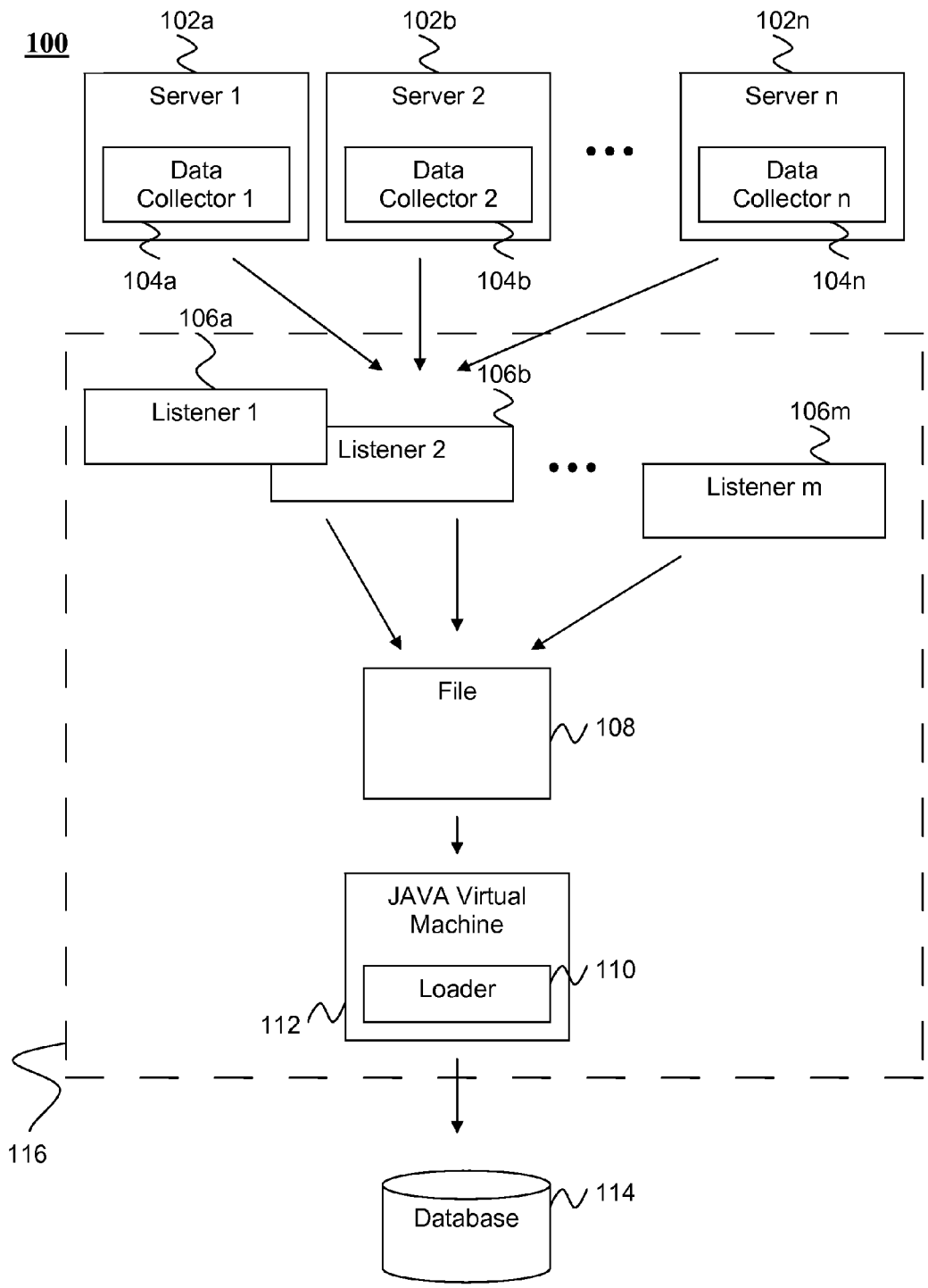
FIG. 1 is a block diagram of a data collection system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Collecting data from server farms that comprise hundreds or thousands of servers may present a large processing load. Thus, the pending application is directed to a quicker and more efficient data collection system and method. For example, the data collection system and method disclosed herein may result in more than a ten fold increase in processing speed.

In an embodiment, a data collection system that comprises a plurality of listeners and a loader is provided. The plurality of listeners may retrieve data from a plurality of data sources and the data may be in a plurality of different formats. The plurality of listeners also may identify the data, parse the data, convert the data into a generic format, validate the converted data, and write the converted data to a file. In an embodiment, the plurality of listeners are implemented using a script programming language. A script programming language contains English-statements for commands and is interpreted (e.g., translated on the fly) rather than compiled ahead of time. Examples of script programming languages include Perl and Hypertext Preprocessor (PHP). Those who are skilled in the art will appreciate that there are other scripting languages. The loader may obtain the converted data from the file and load the converted data into a database. In an embodiment, the loader is implemented using an object oriented programming language. An object oriented programming language models the real world through representation of "objects" or modules that contain data as well as instructions that work upon that data. An example of an object oriented programming language is JAVA. The loader may be operated in a JAVA virtual machine. Implementing the plurality of listeners using a script programming language and the loader using an object oriented programming language may enable an approximate ten fold increase in processing speed. Other examples of object oriented programming languages include C++ and C#. Those who are skilled in the art will appreciate that there are other object oriented programming languages.

In another embodiment, instead of having a single loader, the data collection system comprises a plurality of loaders. In such an embodiment, the plurality of listeners may write the converted data into a plurality of files based on line size. Each of the plurality of loaders may obtain data from a different one of the plurality of files and load the data into a database. Because each of the plurality of files may store data with a particular range of line sizes, each of the plurality of loaders may load data of a particular range of line sizes. In an embodiment, the loader is implemented using an object oriented programming language. Each of the plurality of loaders may be operated in one of a plurality of JAVA virtual machines. In an embodiment, each of the JAVA virtual machines is optimized to process data of a particular range of line sizes. Having a plurality of loaders that each load data of a particular range line sizes and operate in one of a plurality of JAVA virtual machines optimized to process data of that particular range of line sizes may enable an approximate two and a half fold increase in processing speed beyond the ten fold increase obtained from implementing the plurality of listeners and the plurality of loaders using different programming languages.

Turning now to FIG. 1, a data collection system 100 is described. In an embodiment, the system 100 comprises a plurality of servers 102a-102n, a plurality of data collectors 104a-104n, a plurality of listeners 106a-106m, a file 108, a loader 110, a JAVA virtual machine 112, and a database 114. In some contexts herein, the plurality of servers 102a-102n, the plurality of data collectors 104a-104n, and the plurality of listeners 106a-106m may be referred to as the servers 102, the data collectors 104, and the listeners 106, respectively.

In an embodiment, each of the servers 102 may comprise one of the data collectors 104. For example, server 1 102a may comprise data collector 1 104a, server 2 102b may comprise data collector 2 104b, and server n 102n may comprise data collector n 104n. Each of the data collectors 104 may collect data from one of the servers 102. In an embodiment, the data collectors 104 collect application data and/or application performance information from the one or more applications executing on the servers 102. The data collectors 104 also may collect server performance information including CPU and memory utilization information as well as configuration information. In an embodiment, the data collectors 104 collect system metrics that comprise one or more of disk statistics, adapter statistics, global statistics, and network statistics.

The data collectors may collect data that is in a plurality of different formats. For example, the collected data may be in extensible markup language (XML) format, common-separated values (CSV) format, Nigel's Monitor (Nmon) format, and/or some other data format. In an embodiment, the data collectors 104 push the collected data to the listeners 106. The data collector 104 may push the collected data to the listeners 106 periodically.

The listeners 106 may receive the data from the data collectors 104. There may be a one-to-many relationship between each of the listeners 106 and the servers 102. For example, each of the listeners 106 may receive data from a plurality of servers. In an embodiment, after receiving the data, the listeners 106 identify the data, parse the data, convert the data into a generic format, and validate the converted data. The listeners 106 may convert the data into a generic format such as XML or some other type of generic format. In an embodiment, when the listeners 106 receive data that is already in the generic format, the listeners 106 do not parse the data or convert the data. However, the listeners 106 may still validate the data so that any errors may be identified and corrected.

The listeners 106 may be implemented using a script programming language. For example, in a preferred embodiment, the listeners 106 are implemented using Perl. In an alternate embodiment, the listeners 106 are implemented using PHP or another script programming language. Those who are skilled in the art will appreciate that there may be other suitable script programming languages that may be employed.

When the listeners 106 are finished processing the collected data, the listeners 106 may write the collected data to the file 108. In an embodiment, the file 108 is stored in a data store. For example, the file 108 may be stored on a disk or in memory such as random access memory (RAM). While only a single file 108 is illustrated in FIG. 1, a plurality of files may exist. For instance, a new file may be created after file 108 reaches a particular file size or after a predetermined amount of time has elapsed. Additionally, files may be deleted. For example, a file may be deleted after a predetermined amount of time. In combination with the present disclosure, one skilled in the art would appreciate that this kind of housekeeping of the file or files 108 may be employed. Hereinafter the file 108 and other files may be referred to as a single file, but it is expressly understood that the reference to a single file may imply a family of related files. For example files each having a related name such as a first file named CPU_Utilization__2010__09__23__13:07:00_to__2010__09__23__13:10:43 and a second file named CPU_Utilization__2010__09__23__13:10:43_to__2010__09__23__13:17:07 may be referred to in the singular as the CPU Utilization file.

The loader 110 may retrieve the data from the file 108 and load the data into the database 114. In an embodiment, the loader 110 retrieves the data from the file 108 periodically. While only a single database 114 is illustrated in FIG. 1, the loader 110 may load the data into a plurality of databases.

The loader 110 may be implemented using an object oriented programming language. For example, in a preferred embodiment, the loader 110 is implemented using JAVA. In an alternate embodiment, the loader 110 is implemented using another object oriented language. The loader 110 may operate in the JAVA virtual machine 112.

Implementing the listeners 106 using a script programming language and the loader 110 using an object oriented programming language has been found to increase processing speed. For example, an approximate ten fold increase in processing speed may result. The listeners 106, the file 108, the loader 110, and the JAVA virtual machine 112 may be stored and/or executed on a computer system 116. Computer systems are discussed in more detail hereinafter.

Figure 2:
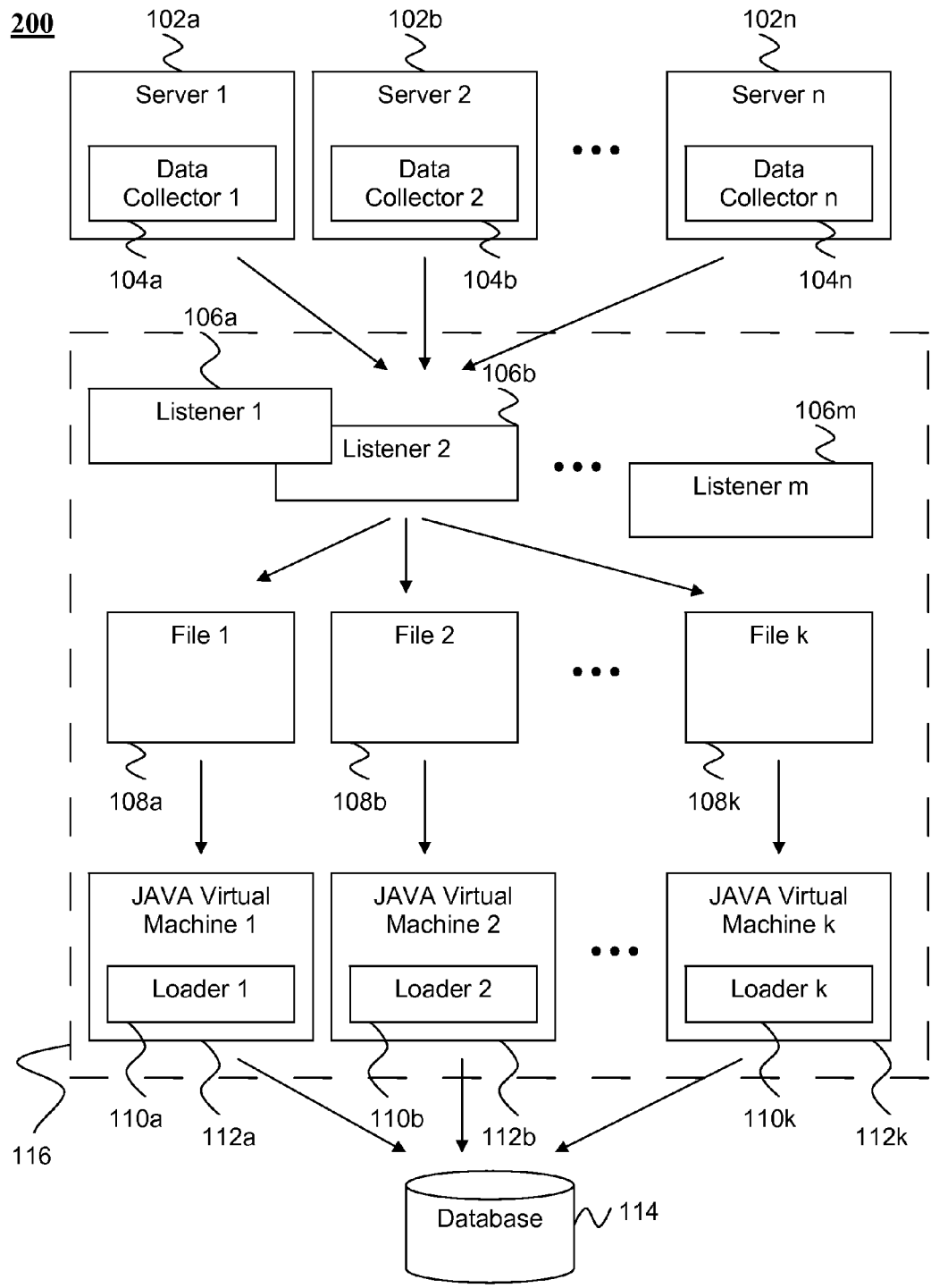
FIG. 2 is a block diagram of a data collection system according to an embodiment of the disclosure.

Turning now to FIG. 2, a data collection system 200 is described. The data collection system of FIG. 2 is similar to the data collection system of FIG. 1 except that the data collection system of FIG. 2 comprises a plurality of files 108a-108k, a plurality of loaders 110a-110k, and a plurality of JAVA virtual machines 112a-112k rather than a single file 108, a single loader 110, and a single JAVA virtual machine 112. Because the plurality of servers 102a-102n, the plurality of data collectors 104a-104n, and the plurality of listeners 106a-106m are substantially similar to those discussed above in regard to FIG. 1, only the plurality of files 108a-108k, the plurality of loaders 110a-110k, and the plurality of JAVA virtual machines 112a-112k will be addressed below. In some contexts herein, the plurality of files 108a-108k, the plurality of loaders 110a-110k, and the plurality of JAVA virtual machines 112a-112k may be referred to as the files 108, the loaders 110, and the JAVA virtual machines 112, respectively.

When the listeners 106 are finished processing the collected data, the listeners 106 may write the collected data to the files 108. In an embodiment, the listeners 106 write the data to one of files 108 based on the line size of the data. In some contexts, lines may be referred to as file lines. For example, each of the files 108 may store data with a different particular line size or a particular range of line sizes and/or a different type of data. Stated another way, each of the files 108 may store data associated with a different size file line. In an embodiment, the files 108 are stored in one or more data stores. For example, the files 108 may be stored on one or more disks or in one or more memory components.

The loaders 110 may retrieve the data from the files 108 and load the data into the database 114. In an embodiment, each of the loaders 110 retrieves the data from a different one of the files 108. Stated another way, there may be a one-to-one relationship between each of the loaders 110 and each of the files. For example, loader 1 110a may retrieve data from file 1 108a, loader 2 110b may retrieve data from file 2 108b, and loader n 110k may retrieve data file n 108k. In an embodiment, each of the loaders 110 retrieves data from a corresponding one of the files 108 periodically. As disclosed above, each of the files 108 may store data of a particular line size or a particular range of line sizes and/or particular data type. For example, the first file 108a may store data of a first line size or a first range of line sizes and/or a first data type and the second file 108b may store data of a second line size or a second range of line sizes and/or a second data type, where the line size or range of line sizes or data type are different between the first file 108a and the second file 108b. Thus, each of the loaders 110 may process data of a particular line size or a particular range of line sizes and/or a particular data type depending upon which of the files 108 the loaders 110 retrieve their data from. While only a single database 114 is illustrated in FIG. 2, the loaders 110 may load the data into a plurality of databases.

The loaders 110 may be implemented using an object oriented programming language. For example, in a preferred embodiment, the loaders 110 are implemented using JAVA. In an alternate embodiment, the loaders 110 are implemented using another object oriented language. Each of the loaders 110 may operate in a different one of the JAVA virtual machines 112.

Each one of the JAVA virtual machines 112 may be independently optimized for the particular line size or the particular range of line sizes and/or the data type associated with the data being loaded there through. For example, JAVA Virtual Machine 1 112a may be optimized for processing data with the particular line size or the particular range of line sizes and/or the particular data type associated with file 1 108a, JAVA Virtual Machine 2 112b may be optimized for processing data with the particular line size or the particular range of line sizes and/or the particular data type associated with file 2 108b, and JAVA Virtual Machine k 112k may be optimized for processing data with the particular line size or the particular range of line sizes and/or particular data type associated with file k 108k.

Optimizing each of the JAVA virtual machines 112 independently may comprise tuning each of the JAVA virtual machines 112 differently. In an embodiment, optimizing each of the JAVA virtual machines 112 may comprise varying the heap memory size, the number of threads, and/or the number of data connections for each of the JAVA virtual machines 112. For example, one or more of the heap size, the number of threads, and/or the number of data connections may be different for each of the JAVA virtual machines 112.

In an embodiment, the heap size of each of the JAVA virtual machines 112 is adjusted differently for the particular line size or the particular range of line sizes and/or the particular data type of the data that each of the JAVA virtual machines 112 will be processing. For example, the heap size may be made smaller for the JAVA virtual machines 112 that are processing data with smaller line sizes and larger for the JAVA virtual machines 112 that are processing data with larger line sizes. Each of the JAVA virtual machines 112 may have a different size heap. Adjusting the heap size of each of the JAVA virtual machines 112 differently depending on the particular line size or the particular range of line sizes and/or the particular data type of each of the JAVA virtual machines 112 may increase efficiency.

In an embodiment, the heap size for each of the JAVA virtual machines 112 may be adjusted to a particular size based on the particular line size or the particular line size range associated with the data being processed by each of the JAVA virtual machines 112 such that each of the JAVA virtual machines 112 processes the data in the new generation portion of heap memory. Adjusting the heap size for each of JAVA virtual machines 112 in this way may prevent data from overflowing and being processed in the old generation portion of heap memory. Sizing the heap of each of the JAVA virtual machines 112 such that each of the JAVA virtual machines 112 processes their respective data in the new generation portion of heap memory rather than in the old generation portion of heap memory may reduce processing time.

The number of threads each of the JAVA virtual machines 112 have also may be varied depending upon the particular line size or the particular range of line sizes and/or the particular data type associated with the data each of the JAVA virtual machines 112 are processing. For example, JAVA virtual machines 112 processing data with smaller line sizes may have a larger number of threads while JAVA virtual machines 112 processing data with larger line sizes may have a smaller number of threads. Each of the JAVA virtual machines 112 may have a different number of threads.

The number of data connections each of the JAVA virtual machines 112 have also may be varied depending upon the particular line size or the particular range of line sizes and/or the particular data type associated with the data each of the JAVA virtual machines 112 are processing. For instance, JAVA virtual machines 112 processing data with smaller line sizes may have a smaller number of data connections while JAVA virtual machines 112 processing data with larger line sizes may have a larger number of data connections. Each of the JAVA virtual machines 112 may have a different number of data connections.

Changing one or more of the above identified parameters for each of the JAVA virtual machines 112 such that each of the JAVA virtual machines 112 is optimized independently for the particular line size or the particular range of line sizes and/or the particular data type associated with the data it will be processing may result in each of the JAVA virtual machines 112 being unique or different. Such an embodiment is in contrast to how JAVA virtual machines have been used in the past. Previously, if a number of JAVA virtual machines were to be used, each of the JAVA virtual machines would be identical to one another. For example, in an enterprise where one or more applications may execute distributed across a plurality of equivalent servers, each server executing one or more JAVA virtual machines, it is customary to configure each of the JAVA virtual machines identically. Optimizing the JAVA virtual machines 112 so that each of the JAVA virtual machines is unique to the particular line size or the particular range of line sizes associated with the data it will be processing may cause an additional two and a half times increase in processing a fixed amount of data beyond the approximate ten fold increase that may result from implementing the listeners 106 using a script programming language and the loader 110 using an object oriented programming language. The listeners 106, the files 108, and the loaders 110 may be stored and/or executed on a computer system 116. Computer systems are discussed in more detail hereinafter.

Figure 3:
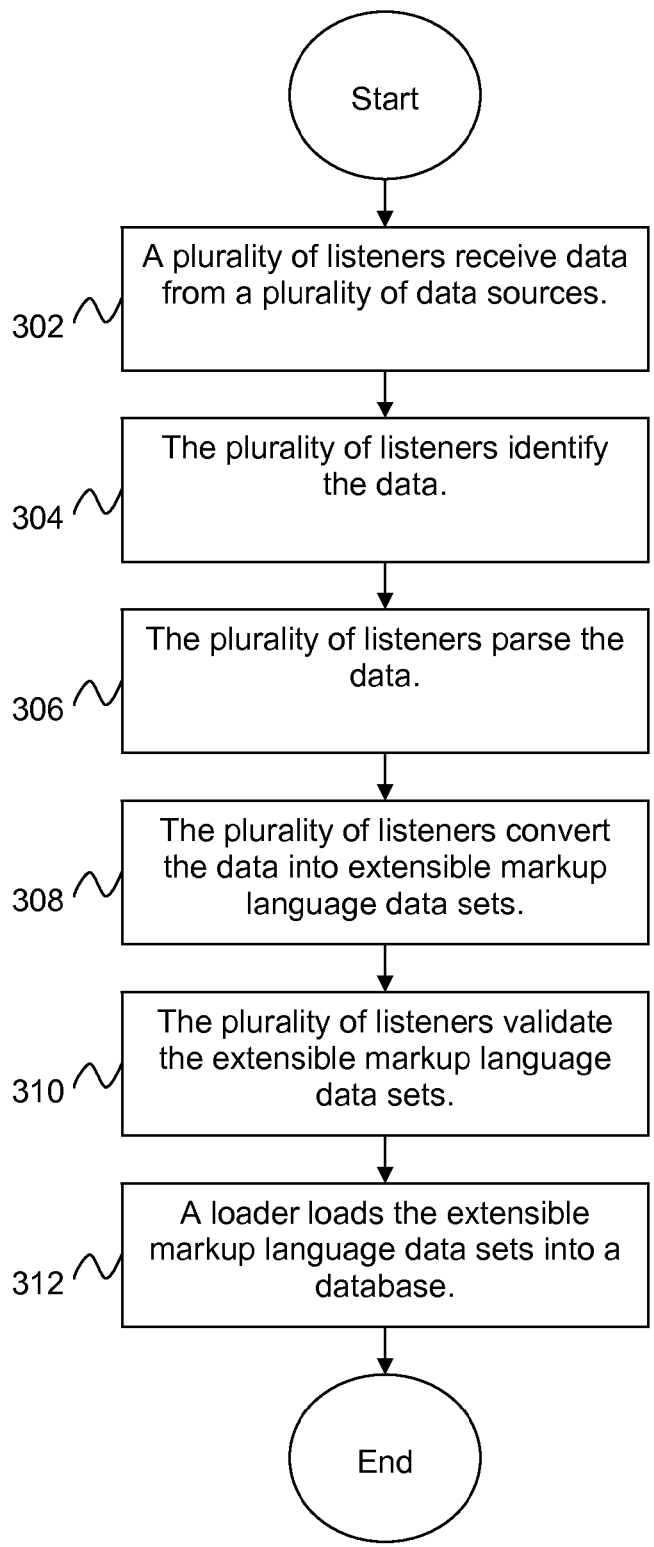
FIG. 3 is a flow chart of a method for collecting data according to an embodiment of the disclosure.

Turning now to FIG. 3, a method 300 for collecting data is described. At block 302, a plurality of listeners 106a-106m receive data from a plurality of data sources. For example, the listeners 106 may receive data from one or more of the plurality of servers 102a-102n. Specifically, the listeners 106 may receive data from one or more of the plurality of data collectors 104a-104n. In an embodiment, the data from the plurality of data sources comprises different formats. For example, the data may be in XML, CSV, Nmon, or some other type of data format.

At block 304, the listeners 106 identify the data. At block 306, the listeners 106 parse the data. At block 308, the listeners 106 convert the data into XML data sets. If some of the data is already in XML then blocks 306 and 308 may not be performed on that particular data. At block 310, the listeners 106 validate the XML data sets. The listeners 106 may be implemented using a script programming language such as Perl.

At block 312, a loader 110 loads the XML data sets into a database. For example, the loader 110 may retrieve the XML data sets from a file 108 and load them into the database 114. The loader 110 may be implemented using an object oriented programming language such as JAVA and operated in a JAVA virtual machine 112.

Figure 4:
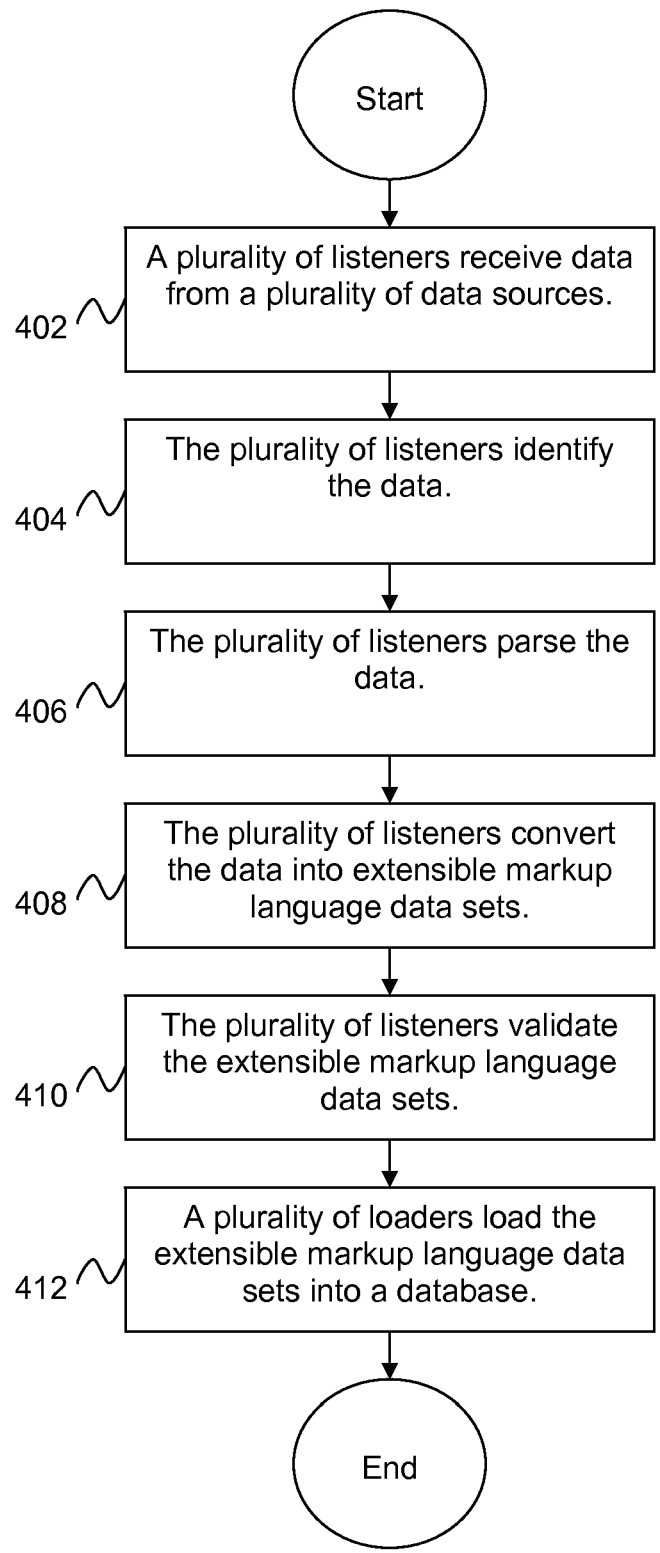
FIG. 4 is a flow chart of a method for collecting data according to an embodiment of the disclosure.

Turning now to FIG. 4, a method 400 for collecting data is described. The method of FIG. 4 is similar to the method of FIG. 3. Specifically, blocks 302-310 of FIG. 3 are substantially similar to blocks 402-410 of FIG. 4. Accordingly, only block 412 will be addressed below.

At block 412, a plurality of loaders 110a-110k load the XML data sets into a database. For example, each of the loaders 110 may retrieve the XML data sets from a different one of the plurality of files 108a-108k and load them into the database 114. Each of the files 108 may store data with a particular line size or a particular range of line sizes. Thus, each of the loaders 110 may load data of a particular line size or a particular range of line sizes and/or a particular data type. In an embodiment, each of the loaders 110 is implemented using an object oriented programming language such as JAVA and operated in a different one of a plurality of JAVA virtual machine 112a-112k. Each of the JAVA virtual machines 112 may be optimized independently of each other for the particular line size or the particular range of line sizes and/or the particular data type associated with the data being loaded there through. In an embodiment, optimizing each of the JAVA virtual machines 112 may comprise varying one or more of the heap memory size, the number of threads, and/or the number of data connections differently for each of the JAVA virtual machines 112. For example, one or more of the heap memory size, the number of threads, and/or the number of data connections may be different for each of the JAVA virtual machines 112.

Figure 5:
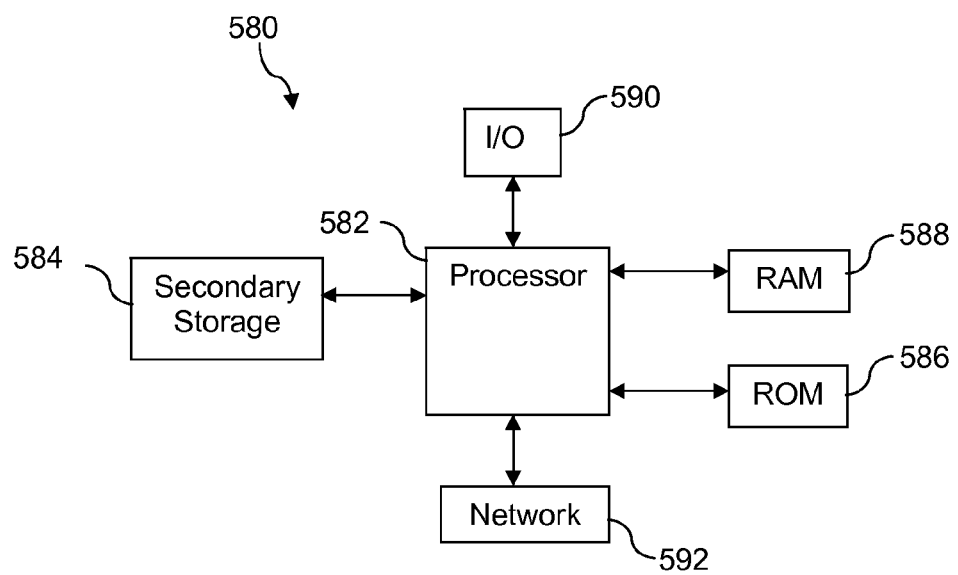
FIG. 5 illustrates an exemplary computer system suitable for implementing the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/ or the ROM 586 may be referred to in some contexts as non-transitory storage and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data in part by directly accessing the computer program product, for example by reading from a CD-ROM disk inserted into a disk drive peripheral of the computer system 580. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A data collection system, comprising:
   a plurality of data sources that produce data, wherein at least some of the plurality of data sources produce data in different formats;
   a plurality of files, wherein each of the plurality of files is associated with a different size file line;
   a plurality of listeners stored in a non-transitory computer readable medium that, when executed by a computer processor, receive the data from the plurality of data sources, identify the data, parse the data, convert the data into a generic format, validate the converted data, and write the converted data to the plurality of files based on a line size of the data, wherein the plurality of listeners are implemented using a script programming language;
   a plurality of loaders stored in a non-transitory computer readable medium that, when executed by a computer processor, load the converted data into a database, wherein the plurality of loaders are implemented using an object oriented programming language, and wherein each of the plurality of loaders loads file lines of a certain size from one of a plurality of files; and
   a plurality of JAVA virtual machines, wherein each of the plurality of loaders is executed in a different one of the plurality of JAVA virtual machines, and wherein each of the plurality of JAVA virtual machines is tuned differently based on the certain size file lines being loaded by the corresponding loader of the plurality of loaders operating therein.

2. The data collection system of claim 1, wherein the script programming language is Perl.

3. The data collection system of claim 1, wherein the object oriented programming language is JAVA.

4. The data collection system of claim 1, wherein the generic format is an extensible markup language based format.

5. A computer-implemented method for collecting data, comprising:
   receiving, by a plurality of listeners implemented using a script programming language, stored on a non-transitory computer readable medium, and executed by a computer processor, data from a plurality of data sources, wherein the data comprises different formats;
   identifying, by the plurality of listeners, the data;
   parsing, by the plurality of listeners, the data;
   converting, by the plurality of listeners, the data into extensible markup language data sets;
   validating, by the plurality of listeners, the extensible markup language data sets;
   writing, by the plurality of listeners the extensible markup language data sets to a plurality of files based on a line size of the data, wherein each of the plurality of files is associated with a different size file line; and
   loading, by a plurality of loaders implemented using an object oriented programming language, stored on a non-transitory computer readable medium, and executed by a computer processor, the extensible markup language data sets into a database, wherein each of the plurality of loaders loads file lines of a certain size from one of the plurality of files, wherein each of the plurality of loaders operate in a different one of a plurality of JAVA virtual machines, and wherein each of the plurality of JAVA virtual machines is tuned differently based on the certain size file lines being loaded by the corresponding loader of the plurality of loaders operating therein.

6. The computer-implemented method of claim 5, wherein the script programming language is Perl.

7. The computer-implemented method of claim 5, wherein the object oriented programming language is JAVA.

8. A data collection system, comprising:
   a plurality of data sources that produce data, wherein at least some of the plurality of data sources produce data in different formats;
   a plurality of files, wherein each of the plurality of files is associated with a different size file line;
   a plurality of listeners stored in a non-transitory computer readable medium that, when executed by a computer processor, receive the data from the plurality of data sources, identify the data, parse the data, convert the data into extensible markup language data sets, validate the extensible markup language data sets, and write the extensible markup language data sets to the plurality of files based on a line size of the data, wherein the plurality of listeners are implemented using a script programming language;
   a plurality of loaders stored in a non-transitory computer readable medium that, when executed by a computer processor, load the extensible markup language data sets into a database, wherein each of the plurality of loaders loads file lines of a certain size from one of the plurality of files, wherein the plurality of loaders are implemented using an object oriented programming language; and
   a plurality of JAVA virtual machines, wherein each of the plurality of loaders operates in a different one of the plurality of JAVA virtual machines, and wherein each of the plurality of JAVA virtual machines is tuned differently based on the certain size file lines being loaded by the corresponding loader of the plurality of loaders operating therein.

9. The data collection system of claim 8, wherein each the plurality of files is associated with a different range of file line sizes.

10. The data collection system of claim 9, wherein each of the plurality of loaders loads file lines of a certain range of sizes from one of the plurality of files.

11. The data collection system of claim 8, wherein each of the plurality of JAVA virtual machines is tuned differently by varying at least one of a heap size, a number of threads, and a number of data connections for each of the plurality of JAVA virtual machines.

* * * * *